UNITED STATES PATENT OFFICE.

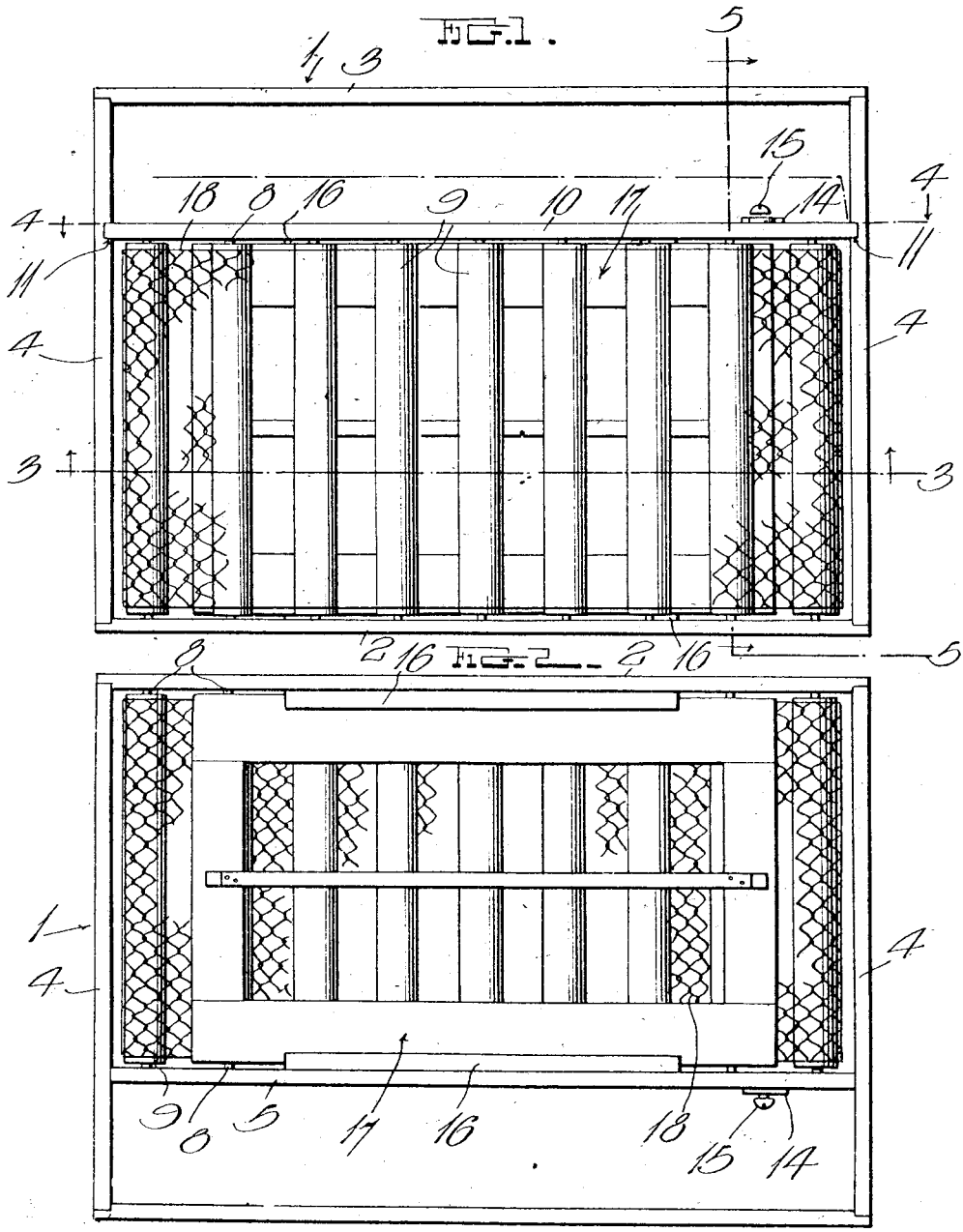

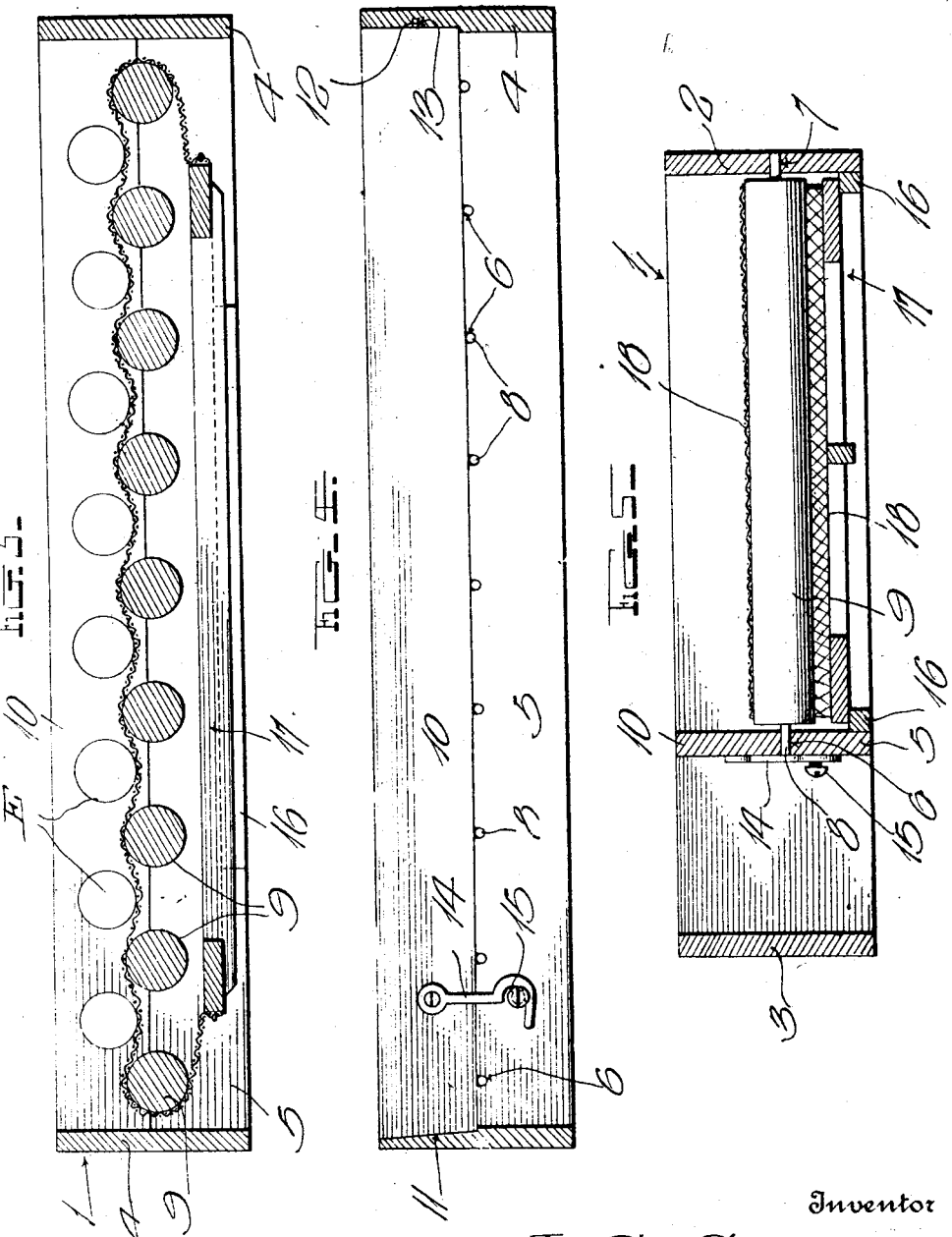

JAMES G. CARMAN, OF AUBURN, NEBRASKA.

EGG-TRAY FOR INCUBATORS.

1,182,248. Specification of Letters Patent. Patented May 9, 1916.

Application filed January 27, 1916. Serial No. 74,644.

*To all whom it may concern:*

Be it known that I, JAMES G. CARMAN, a citizen of the United States, residing at Auburn, in the county of Nemaha and State of Nebraska, have invented certain new and useful Improvements in Egg-Trays for Incubators; and I do declare the following to be a full, clear, and exact description of the invention, such as will enable others skilled in the art to which it appertains to make and use the same.

My invention is an improved egg tray for incubators, the object of the invention being to provide a simply constructed and inexpensive device of this class by the use of which the eggs supported thereon may be expeditiously turned.

With this general object in view, the invention resides in certain novel features of construction and in unique combinations of parts to be hereinafter fully described and claimed, the descriptive matter being supplemented by the accompanying drawings which constitute a part of this application, and in which:

Figures 1 and 2 are respectively top and bottom plan views of the improved tray; Figs. 3 and 4 are longitudinal sectional views as seen on the planes of the lines 3—3 and 4—4 of Fig. 1, and Fig. 5 is a transverse section taken on the plane of the line 5—5 of Fig. 1.

In specifically describing the construction shown in the drawings above briefly described, similar characters will be placed on corresponding parts throughout the several views, and reference will be herein made to the numerous elements by their respective indices. To this end, the numeral 1 designates a rectangular horizontally disposed frame consisting of front and rear bars 2 and 3, and end bars 4. Spaced forwardly from the bar 3 and lying parallel therewith, is a longitudinally disposed bar 5 having its end secured to the end bars of the frame 1, said bar 5 being of less height than the latter and having in its upper edge a series of bearing notches 6 extending transversely thereof. The notches 6 are alined with circular openings 7 formed through the front bar 2, said notches and openings receiving therein journals 8 which project from the opposite ends of a series of rollers 9, said rollers being all disposed in the same horizontal plane and being positioned in parallel relation.

For the purpose of preventing removal of the journals 8 from the notches 6, a longitudinally disposed stop bar 10 overlies the bar 5, as clearly shown in Fig. 4, both ends of said bar 10 being received in vertical grooves 11 formed in the end bars 4. One end of this bar 10 is provided with a longitudinally extending stud 12 projecting into an opening 13 in the adjacent bar 4, whereby to hold this end of the bar against upward movement until the other end thereof is raised. Raising of the last named end of the bar 10, however, is normally prevented by a hook 14 pivoted thereto and coöperating with a stud or the like 15 carried by the bar 5.

Secured to the inner sides of the bars 2 and 5, are cleats 16 upon which the side bars of a rectangular frame 17 rest slidably, the ends of said frame being secured in any preferred manner to the ends of a sheet 18 of flexible material which loosely overlies the rollers 9, said ends of the sheet in question being carried around the endmost rollers as shown. The frame 17 is of such length as to allow shifting thereof between the two end bars 4, the latter serving to limit the movement thereof. This shifting obviously will cause the sheet 18 to travel over the rollers 9, thereby turning the eggs E which rest on said sheet and depress the same between the numerous rollers, as shown in Fig. 3. The result of this operation, is that the eggs may be all turned simultaneously for reasons well known to those familiar with incubation.

By the use of the improved tray constructed as above described, good results can be obtained, and after the young chickens have been hatched, they may descend into the usual brooder section of the incubator through the space between the bars 3 and 5.

From the foregoing, taken in connection with the accompanying drawings, the construction, manner of operation, and numerous advantages of the improved device will be appreciated without requiring a more extended explanation. In conclusion, however, I will state that although certain specific details have been shown and described for illustrative purposes, numerous changes may be made within the scope of the invention as claimed without sacrificing the primary advantages thereof.

I claim:

1. An egg tray of the class described comprising a horizontally disposed rectangular frame including one side bar of less height than the others, said bar having in its upper edge a plurality of spaced notches extending transversely thereof, while the opposed bar of the frame is formed with openings alined with said notches, the other bars having in their inner sides upright grooves rising from the ends of said first named bar, a plurality of parallel horizontally disposed rollers having journals at their opposite ends received in the apertures and notches, a stop bar resting on said first named bar and having its ends received removably in the aforesaid grooves, means for preventing upward movement of said stop bar, and a sheet of flexible material overlying the rollers and shiftable transversely thereof.

2. An egg tray of the class described comprising a horizontally disposed rectangular frame including one side bar of less height than the others, said bar having in its upper edge a plurality of spaced notches extending transversely thereof, while the opposed bar of the frame is formed with openings alined with said notches, the other bars having in their inner sides upright grooves rising from the ends of said first named bar, a plurality of parallel horizontally disposed rollers having journals at their opposite ends received in the apertures and notches, a stop bar resting on said first named bar and having its ends received removably in the aforesaid grooves, a pin projecting longitudinally from one end of said stop bar through an aperture in the adjacent side bar of the frame, and a releasable fastener for preventing upward movement of the other end of said stop bar.

In testimony whereof I have hereunto set my hand in presence of two subscribing witnesses.

JAMES G. CARMAN.

Witnesses:
 ELIZABETH TYNON,
 ROB'T M. ARMSTRONG.